No. 838,915. PATENTED DEC. 18, 1906.
S. SYKES.
FISHING REEL.
APPLICATION FILED APR. 3, 1906.

WITNESSES:

INVENTOR
Stanley Sykes
BY Munn & Co.
ATTORNEYS

UNITED STATES PATENT OFFICE.

STANLEY SYKES, OF RHOADES, ARIZONA TERRITORY.

FISHING-REEL.

No. 838,915.          Specification of Letters Patent.          Patented Dec. 18, 1906.

Application filed April 3, 1906. Serial No. 309,594.

*To all whom it may concern:*

Be it known that I, STANLEY SYKES, a citizen of the United States, and a resident of Rhoades, in the county of Coconino and Territory of Arizona, have invented a new and Improved Fishing-Reel, of which the following is a full, clear, and exact description.

This invention is an improvement in fishing-reels and has, among other objects, to provide a reel that can be changed from a high to a low speed gearing controlled automatically by the pull of the fish.

It is well known that in attempting to land fish, especially large fish, that it is desirable to change the relative rotation of the spool with respect to its handle in order that the power may be increased and the fish landed with little exertion. If this relative rotation of the spool to the handle is changed by some means operated by the fisherman, it is often forgotten until it is too late to be brought into action and much labor expended in winding the line in. With my invention this difficulty is overcome and the labor required in changing the gearing of the reel is automatically performed by the pull of the fish.

Reference is to be had to the accompanying drawings, forming a part of this specification, in which similar characters of reference indicate corresponding parts in all the figures.

Figure 1:
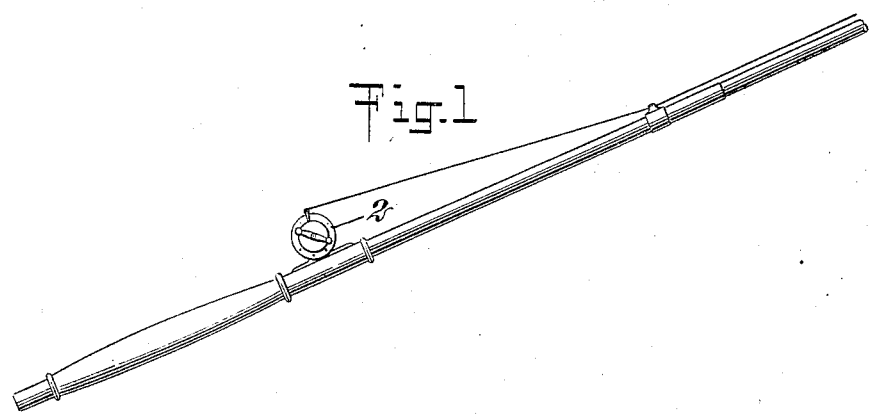
Figure 3:
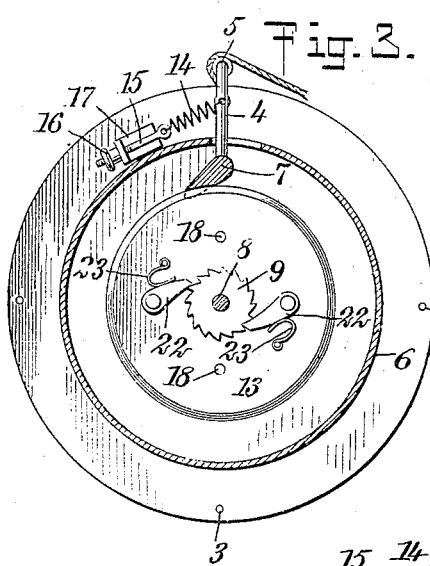
Figure 2:
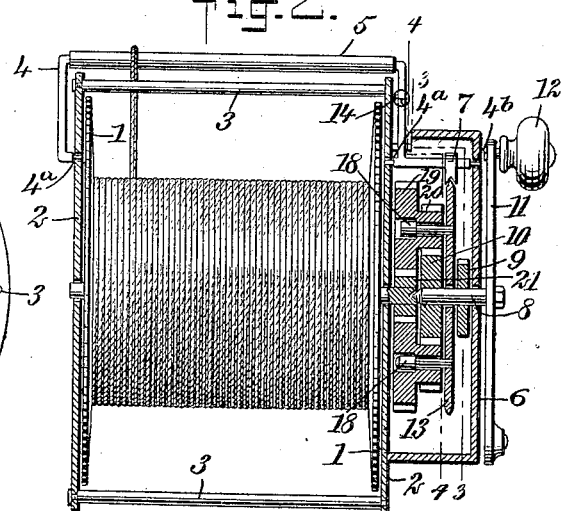
Figure 4:
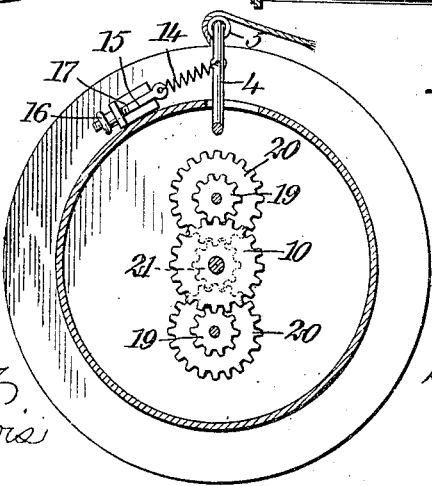

Figure 1 is an end elevation of the reel attached to a fishing-pole. Fig. 2 is a side elevation of the reel with the gearing and gear-casing in section. Fig. 3 is a section on the line 3 3 of Fig. 2, and Fig. 4 is a section on the line 4 4 of Fig. 2.

The numeral 1 indicates a spool journaled in side supports 2 2, connected by rods 3 3 of usual construction. Journaled at the outer side of the supports 2 2 at $4^a$ is a U-shaped brake-lever 4, straddling the upper end of the spool and supports and carrying a loose roller 5 on its horizontal portion. One of the vertical arms of the lever 4 at its pivotal connection is extended away from the supports 2 and journaled in a gear-casing 6 at $4^b$, said extended portion being provided with a brake-shoe 7, having a V-shaped notch in its lower face. Journaled at the center of the casing and in the adjacent end of the spool-spindle is a pointed pin or spindle 8, having fixed thereto a ratchet-wheel 9 and a gear 10 in the casing and an operating-lever 11 and knob 12 at the outside of the casing. Intermediate the gear 10 and ratchet-wheel 9 is loosely mounted on the pin or spindle 8 a brake-disk 13, with a V-shaped periphery adapted to be engaged by the brake-shoe 7, normally held in contact therewith by a spring 14, attached at one end to the vertical arm of the lever 4 and at its opposite end to a screw-eye 15, said screw-eye having a nut 16 threaded thereon, engaging a vertical arm of a bracket 17, secured to the adjacent support 2. The brake-disk 13 carries at one side bearing-pins 18, with enlarged heads forming bearings for gears 19 and 20, said gears being integrally connected and meshing, respectively, with a gear 21, fixed to the spool-spindle and with the gear 10 on the spindle 8.

At the ratchet side of the brake-disk 13 are pivoted pawls 22, pressed by springs 23 in contact with the teeth of the ratchet-wheel 9, said pawls being so arranged with respect to the teeth that they alternately engage the same as the handle 12 is rotated.

The operation of the reel is as follows: Assuming that the fishing-line has been wound about the spool, it is passed over the roller 5 and out to the end of the fishing-pole in the usual manner, as shown in Fig. 1. So long as the line remains slack the brake-shoe by the action of the spring contacts with the brake-disk and prevents any rotation thereof, and therefore holds the bearing-pins 18 from rotary movement. On winding up the line by turning the handle 12 with the brake-disk thus engaged the gear 10 turns the gears 21 through the intermeshing gears 19 and 20, and as the gears 10 and 19 are provided with about four times as many teeth as the gears 20 and 21 the spool will rotate four times as fast as the handle 12. If, however, the line is pulled forward, as by the bite or weight of a fish, the lever carrying the brake-shoe is rocked in its bearings, releasing the brake-disk, which now rotates with the gears 19 and 20 about the gear 21, turning this gear at the same rate as if directly connected to the spindle 8. The pawls 22, engaging the ratchet-wheel 9, prevent the brake-disk 13 from revolving faster than the handle 12, and thereby enforces the rotation of the spool. The nut 16 permits the tension on the spring 14 to be adjusted in order that the pull required on the line to release the shoe 7 may be regulated.

It is evident that various changes may be made in the details of construction hereinbefore described without departing from the spirit of my invention, and I reserve the right to make such modifications as fall within the scope of the invention as claimed.

Having thus described my invention, I claim as new and desire to secure by Letters Patent—

1. In a fishing-reel, supports, a spool journaled in the supports, a lever journaled in the supports and straddling the spool, a brake-shoe carried by the lever, a gear-casing fixed to one of the supports, a spindle journaled in the gear-casing and connected to a handle, a ratchet-wheel and a gear fixed to the spindle, a braking-disk fixed on the spindle and carrying pawls engaging the ratchet, pins projecting from one side of the disk, a gear fixed to the spool-spindle, rigidly-connected gears journaled on the pins and meshing with the aforesaid gears, and a spring for normally holding the shoe in engagement with the disk.

2. In a fishing-reel, supports, a spool journaled in the supports and adapted to have a line wound thereabout, driving means for rapidly revolving the spool when the line is slack, and means for decreasing the relative rotation of the spool to the driving means automatically controlled by the pull on the line.

3. In a fishing-reel, supports, a spool journaled in the supports and adapted to have a line wound thereabout, a lever journaled in the supports and passing above the spool, means for driving the spool rapidly when the lever is pulled in one direction, and means for decreasing the relative rotation of the spool to the driving means when the lever is pulled in the opposite direction.

4. In a fishing-reel, supports, a spool journaled in the supports and adapted to have a line wound thereabout, a lever journaled in the supports and passing above the spool, braking means carried by the lever at one side of the spool, means for revolving the spool rapidly when the braking means are in contact, and means for decreasing the relative rotation of the spool when the braking means are disengaged.

5. In a fishing-reel, supports, a spool journaled in the supports, a lever journaled in the supports, a brake-shoe carried by the lever, a spindle for driving the spool, a brake-disk mounted on the spindle, means for normally holding the shoe and disk in contact, whereby the spool may be driven rapidly, and means for decreasing the relative rotation of the spool when the shoe and disk are separated.

6. In a fishing-reel, supports, a spool journaled in the supports and adapted to have a line wound thereabout, gearing for driving the spool at high speed when the line is slack, and means for automatically decreasing the relative rotation of the spool to the gearing when the line is taut.

In testimony whereof I have signed my name to this specification in the presence of two subscribing witnesses.

STANLEY SYKES.

Witnesses:
HARRY C. HIBBEN,
T. E. PULLIAM.